United States Patent

[11] 3,584,649

| [72] | Inventor | Clyde E. Cobb<br>Lake View Terrace, Calif. |
|---|---|---|
| [21] | Appl. No. | 833,032 |
| [22] | Filed | June 13, 1969 |
| [45] | Patented | June 15, 1971 |
| [73] | Assignee | Bell Aerospace Corporation |

[54] RESILIENTLY DEFORMABLE INTERCONNECTION BETWEEN DRIVEN AND DRIVING MEMBERS IN SERVO VALVE
4 Claims, 4 Drawing Figs.

[52] U.S. Cl. ............................................. 137/625.61,
137/83, 137/85, 137/625.64, 287/49
[51] Int. Cl. ........................................... F16k 11/07
[50] Field of Search ........................... 287/49, 51;
4/204; 24/81 B; 248/62; 137/83, 85, 625.61, 625.63, 625.64

[56] References Cited
UNITED STATES PATENTS

| 3,019,805 | 2/1962 | Gordon | 137/625.61X |
| 3,437,101 | 4/1969 | Coakley et al. | 137/85X |
| 611,639 | 10/1898 | Leslie | 287/49 |
| 2,179,582 | 11/1939 | Wiley | 292/306UX |
| 3,125,764 | 3/1964 | Young | 4/204 |
| 3,233,297 | 2/1966 | Havener | 24/81B |
| 3,377,038 | 4/1968 | Loudon | 248/62X |

FOREIGN PATENTS

| 13,369 | 6/1896 | Great Britain | 287/49 |
| 903,684 | 8/1962 | Great Britain | 287/49 |
| 112,531 | 11/1964 | Czechoslovakia | 287/51 |

*Primary Examiner*—Henry T. Klinksiek
*Attorney*—Nilsson, Robbins, Wills & Berliner

ABSTRACT: Disclosed is a jet-pipe-type servo valve wherein the feed tube is disposed at a right angle with respect to a flapper to which it is affixed and which is movable by a torque motor the armature of which is connected to the flapper. The feed tube has one end thereof affixed rigidly to the housing and the other end thereof terminating in a nozzle which is directed toward a receiver. The output ports of the receiver are connected to the end chambers of a cylinder within which a power control valve is slidably positioned so as to control the flow of fluid under pressure from a source thereof to an apparatus to be positioned such as an actuator. The connection between the jet pipe and the flapper is flexible.

INVENTOR
CLYDE E. COBB
BY Nilsson+Robbins
ATTORNEYS

INVENTOR
CLYDE E. COBB
BY Nilsson & Robbins
ATTORNEYS

RESILIENTLY DEFORMABLE INTERCONNECTION BETWEEN DRIVEN AND DRIVING MEMBERS IN SERVO VALVE

BACKGROUND OF THE INVENTION

Jet pipe servo valves have long been known and typical examples of such apparatus are shown in U.S. Pat. Nos. 2,884,906; 2,884,907; 2,996,072 and 3,017,864. As can be seen from these prior art patents, typical jet pipe servo valves are constructed in such a manner that the feed tube and the armature of the torque motor are an integral unit or at the most the feed tube is axially an extension of the torque motor armature so there is no separation between the driven and driving members of the servo valve. When the jet pipe (driven member) and flapper (driving member) are separate members, they must be joined in a manner to preclude hysteresis, while providing reliability and ease of assembly.

DESCRIPTION OF THE PREFERRED EMBODIMENT

Figure 1:
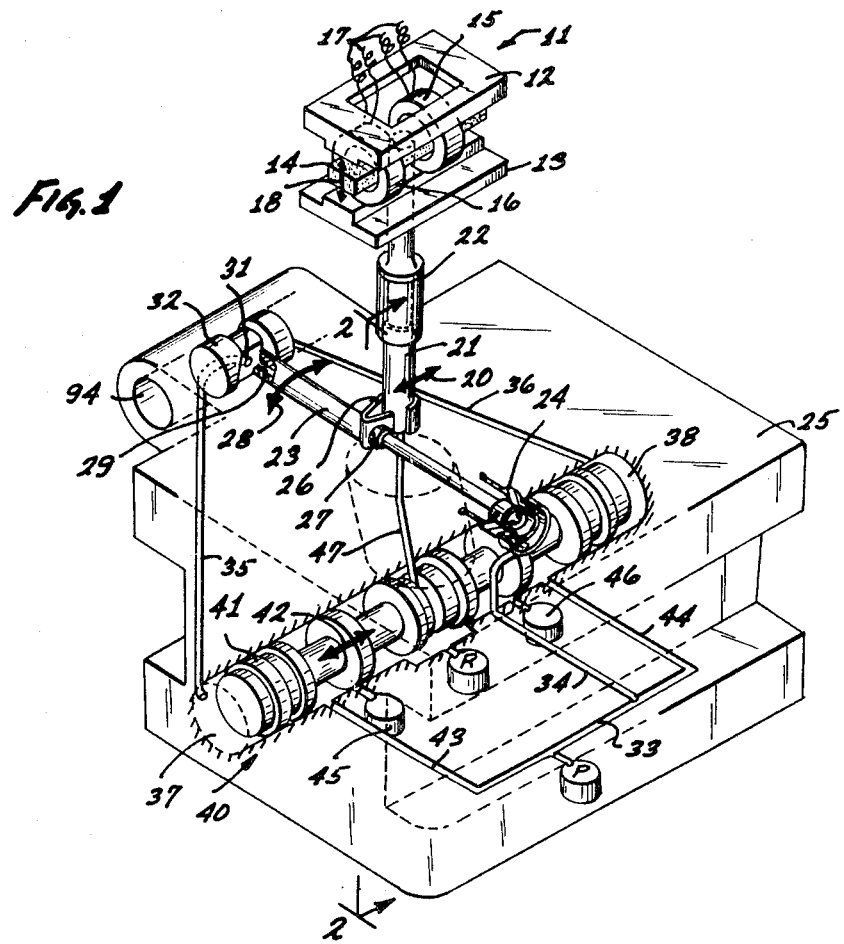
FIG. 1 is a schematic diagram shown in perspective of a jet pipe servo valve constructed in accordance with the present invention.

Referring now to FIG. 1, there is illustrated a jet pipe servo valve which includes a torque motor 11 having pole pieces 12 and 13 with an armature 14 disposed therebetween. A pair of coils 15 and 16 are disposed to receive an input signal upon leads 17 thereby to provide movement of the armature and, as indicated by the arrow 18, which is proportional to the magnitude of the input signal.

A flapper 21 is rigidly connected to the armature 14 so as to move as indicated by the arrow 20 in response to movement of the armature 14. The flapper 21 is suspended within a torque tube 22 so as to provide a seal between the fluid sections of the servo valve and the torque motor. Such a suspension is well known and, for example, is illustrated in U.S. Pat. No. 3,221,760. A feed tube 23 has one end thereof rigidly affixed to a retainer member 24 which in turn is rigidly affixed to the body portion 25 of the housing. The feed tube terminates in an ejector end having a nozzle 29 which is positioned with the orifice directed toward openings 31 in a receiver port means 32. The feed tube 23 is constructed of a hollow flexure tube which is movable, i.e. bendable about the rigidly affixed end thereof, with respect to the housing. The bending movement is imparted to the tube 23 by way of a resiliently deformable or flexible mechanical connection such as the link or spring means 26 which is rigidly affixed to the flapper 21, but is releasably attached to the tube 23 by being inserted through an opening 27 defined by the spring means 26. Thus, as the flapper 21 moves, the feed tube 23 also is caused to move as indicated by the arrow 28. As is illustrated by the difference in arrows 20 and 28, the mechanical interconnection provides amplification of movement of the nozzle tip as compared to the flapper 21. Thus, small armature movement results in larger nozzle tip movement.

Fluid under pressure is provided from a source thereof (not shown) through conduits 33 and 34 to the fixed or receiving end portion of the feed tube 23. As the nozzle 29 moves with respect to the receiver ports 31, differential pressure is applied through conduits 35 and 36 to the end chambers 37 and 38, respectively, of the power control valve spool shown generally at 40. The structure of a flow control valve spool is well known in the prior art, and, for example, detailed description thereof may be formed in the above referenced patents and U.S. Pat. No. 2,947,286. Generally movement of the valve spool 41 in response to differential pressure thereacross in the end chambers 37 and 38 as indicated by the arrow 42, causes fluid under pressure to flow through the conduits 33 and 43 or 44 to an actuator connected to cylinder ports 45 and 46 depending upon the direction of movement of the valve 41. As the valve 41 thusly moves, such movement is transmitted as a feedback signal to the torque motor by way of a feedback spring 47 which is affixed to the armature 14.

Figure 2:
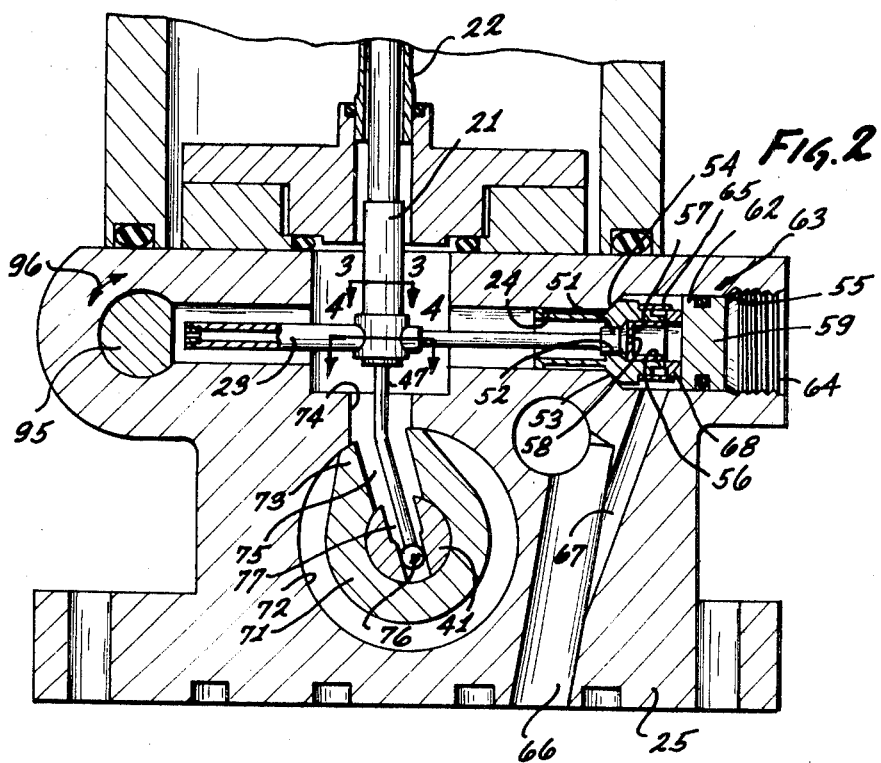
FIG. 2 is a cross-sectional view of the servo valve illustrated in FIG. 1, taken about the line 2-2.
Figure 4:
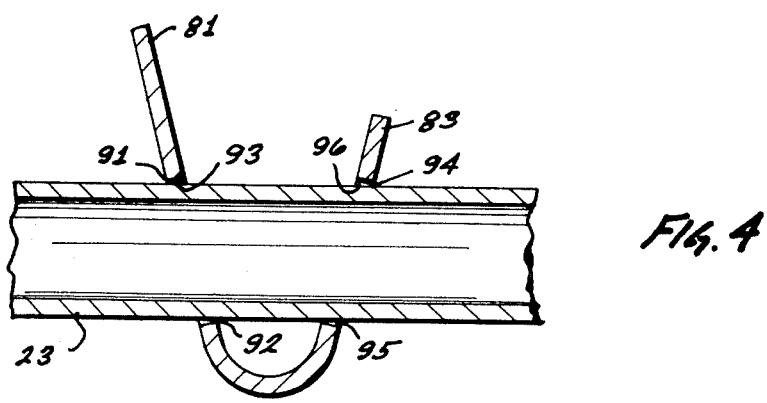
FIG. 4 is a fragmentary cross-sectional enlarged view taken about the line 4-4 of FIG. 2.

Referring now more particularly to FIG. 2, the manner in which the feed tube is rigidly affixed to the body 25 is illustrated. As is therein illustrated, the end 51 of the feed tube is rigidly affixed as by brazing or the like to an opening 52 provided in the retainer 24. The retainer 24 defines a bevelled surface 53 which mates with a bevelled shoulder 54 defined by the bore 55 into which the retainer 24 is inserted. The retainer 24 defines a reentrant bore 56 which receives a cup-shaped member 57 defining a restriction orifice 58, the function of which is well known in the art. It should be understood that the restriction orifice is used only in instances of high fluid pressure where it is deemed desirable to drop some pressure prior to the fluid reaching the nozzle orifice. A plug 59 is also received within the bore 55 and is utilized to force the surface 53 into engagement with the shoulder 54 thereby effecting a metal-to-metal seal against the leakage of fluid under pressure. This function is accomplished through the shoulder 62 which abuts the end edge 63 of the retainer 24. A lock screw 64 is then threaded into the bore 55 and urges the plug 59 against the retainer 24 thereby causing the entire assembly to firmly seat in place. A wire screen filter 65 is seated within a reduced diameter area of the retainer 24 and is also held in place by the plug 59. Fluid under pressure enters the body 25 through an opening 66 provided therein. An auxiliary opening 67 is also provided in the body and communicates between the opening 66 and the reentrant bore 56 provided in the retainer 24 through the openings 68 formed in the rear edge 63 of the retainer 24.

As is also illustrated in FIG. 2, the valve spool 41 is slidably disposed within a sleeve 71 which is seated within a bore 72 provided in the body 25. The sleeve 71 is provided with a land 73 which provides a seal about an opening 74 defined by the body 25 and through which the feedback spring 47 passes. The land 73 is relieved to provide an opening 75 through which the feedback spring 47 also passes. As is illustrated, the feedback spring 47 terminates in a ball 76 which is disposed within an opening 77 provided in the valve spool 41. As is clear from FIGS. 1 and 2, the feed tube is positioned solely within the body of the housing thus eliminating the usual external plumbing to provide fluid under pressure to the feed tube.

Figure 3:
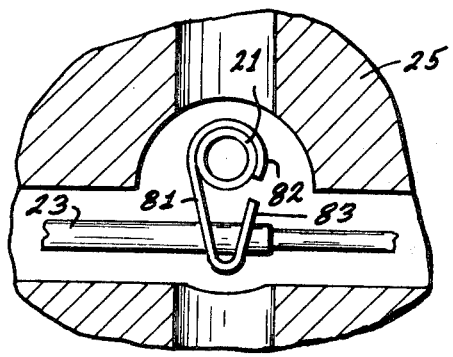
FIG. 3 is a fragmentary cross-sectional view taken about the line 3-3 of FIG. 2.

By reference to FIG. 3, a more detailed understanding in the manner which the feed tube 23 is connected to the flapper 21 can be had. As is therein shown, the spring means 26 comprises a leaf spring having a flexible body section 81 terminating in one end portion 82 which is wrapped around the flapper 21 and is rigidly affixed thereto as by brazing, soldering, or the like. The body 81 terminates in a second end portion 83 which is bent so as to provide substantially a V-shaped section with part of the flexible body portion 81 forming one leg of the "V". The body portion 81 and the end portion 83 each define axially aligned elongated openings therethrough and through which the feed tube 23 is disposed. The minor diameter of the openings is slightly larger than the outer diameter of the feed tube. In the position shown FIG. 3, the edges of the legs of the V-shaped section defining the openings grip the feed tube. That is, the spring tension of the legs of the V-shaped section is sufficiently great in the opening direction (increasing the distance between the legs) to cause the opposite edges 91 and 92 of the opening 93 and the opposite edges 94 and 95 of the opening 96 to grip the feed tube 23. The legs of the V-shaped section may be compressed to release the gripping action for assembly or positioning of various parts of the apparatus.

Once such positioning has occurred, the legs of the "V" may be released and the spring tension causes the spring clip 26 to grip the feed tube 23 and holds it firmly in place with respect to the flapper 21 as above described. Obviously the spring means 26 may be a spring wire member wrapped around the flapper and feed tube if desired.

With an assembly such as illustrated herein the torque motor may be replaced if desired by compressing the legs of the "V" of the spring clip, removing the feed tube and lifting the torque motor from the body. It should also be clear that there is no sliding joint between the driving and driven members. Thus, friction and hysteresis is eliminated. The spring rate of the flexure tubes forming the feed tube and the flapper are high compared to the spring rate of the body section 81 so that for all practical purposes the dynamic effects of the spring rate of the body section is negligible. Thus, as can be seen from the design, as the feed tube 23 flexes to follow the flapper 21, the spring body section 81 bends so that no distortion is transmitted to the feed tube.

What I claim is:

1. An electrohydraulic jet pipe servo valve comprising:
   a. flapper means;
   b. torque motor means for driving said flapper means responsive to electrical signals applied thereto;
   c. feed tube means angularly disposed with respect to said flapper means and having one end fixedly secured and the opposite end free to move;
   d. receptor means positioned adjacent to said opposite end of said feed tube; and
   e. spring means having first and second ends with a body portion therebetween, said first end being permanently affixed to said flapper means and said second end being frictionally affixed to said feed tube means intermediate the ends thereof.

2. The servo valve as defined in claim 1, wherein said spring means is a leaf spring.

3. The servo valve as defined in claim 2, wherein said flapper means and feed tube means are disposed at right angles and are separated and said body portion of said leaf spring has a spring rate much less than the spring rate of either said flapper means or said feed tube means.

4. The servo valve as defined in claim 3 wherein said second end of said leaf spring is bent to substantially a V-shape while retaining spring tension and the arms of said "V" define aligned openings therethrough, and said feed tube means extends through said openings and is gripped by said arms of said "V" moving part and said first end of said leaf spring is bent to conform to a surface of said flapper means.